US012701114B2

(12) United States Patent
Han et al.

(10) Patent No.: US 12,701,114 B2
(45) Date of Patent: Aug. 4, 2026

(54) CONTINUOUS USER VERIFICATION AND SERVICE ACCESS CONTROL METHOD THROUGH FACIAL AUTHENTICATION

(71) Applicant: AIRCUVE INC., Seoul (KR)

(72) Inventors: You Serk Han, Gimpo-si (KR); Sang Hun Seok, Goyang-si (KR)

(73) Assignee: AIRCUVE INC., Seoul (KR)

( * ) Notice: Subject to any disclaimer, the term of this patent is extended or adjusted under 35 U.S.C. 154(b) by 28 days.

(21) Appl. No.: 18/825,248

(22) Filed: Sep. 5, 2024

(65) Prior Publication Data

US 2026/0012453 A1      Jan. 8, 2026

(30) Foreign Application Priority Data

Jul. 4, 2024      (KR) ........................ 10-2024-0088296

(51) Int. Cl.
H04L 9/40             (2022.01)
(52) U.S. Cl.
CPC ................................ H04L 63/0861 (2013.01)
(58) Field of Classification Search
None
See application file for complete search history.

(56) References Cited

U.S. PATENT DOCUMENTS

| | | | | |
|---|---|---|---|---|
| 8,819,803 | B1 * | 8/2014 | Richards | ............. H04L 63/1483 709/224 |
| 9,654,469 | B1 * | 5/2017 | Yang | ........................ H04L 67/02 |
| 2021/0409403 | A1 * | 12/2021 | Lewin | ................... H04L 67/145 |

FOREIGN PATENT DOCUMENTS

| | | |
|---|---|---|
| KR | 10-2017-0000128 A | 1/2017 |
| KR | 10-2018-0109109 A | 10/2018 |

* cited by examiner

*Primary Examiner* — Piotr Poltorak
(74) *Attorney, Agent, or Firm* — Studebaker Brackett PLLC

(57) ABSTRACT

Disclosed is an operation method of a service access control system. The operation method includes, when an access request of a registered user, which includes access right information, is received through a first user terminal, providing, by a service server, a service to the first user terminal, controlling, by the service server, the first user terminal to capture facial images of the registered user at regular intervals regardless of user input while the service is being provided, obtaining, by an authentication server, the facial images captured by the first user terminal at the regular intervals, performing, by the authentication server, facial authentication at the regular intervals on the basis of the facial images, and when the facial authentication fails, deactivating, by the service server, an access session of the first user terminal to the service and interrupting providing the service.

8 Claims, 8 Drawing Sheets

FACIAL AUTHENTICATION

PLEASE LOOK AT THE CAMERA

CHANGE AUTHENTICATION
METHOD

CONTINUOUS USER VERIFICATION AND SERVICE ACCESS CONTROL METHOD THROUGH FACIAL AUTHENTICATION

CROSS-REFERENCE TO RELATED APPLICATION

This application claims priority to and the benefit of Korean Patent Application No. 10-2024-0088296, filed on Jul. 4, 2024, the disclosure of which is incorporated herein by reference in its entirety.

BACKGROUND

1. Field of the Invention

The present disclosure relates to a service access control system for verifying a user through facial authentication, and more specifically, to an access control method in which periodic facial authentication and reinforced authentication are performed.

2. Discussion of Related Art

Typically, authentication methods for verifying user reliability are classified into methods based on three factors.

The first factor is the basis of a knowledge-based authentication method in which identification is performed by checking information that only the user knows. For example, the first factor is the basis of a method of entering a password, a personal identification number (PIN), or the like. The second factor is the basis of a possession-based authentication method in which identification is performed by presenting a tool that only the user has. For example, the second factor is the basis of a method of authenticating the user using a one-time password (OTP) card or Universal Serial Bus (USB) security key that the user possesses. The third factor is the basis of a biometric-based authentication method in which identification is performed by presenting the user's own physical characteristics. For example, the third factor is the basis of a method of authenticating the user using facial information or fingerprint information.

In a password-based authentication method, which is a conventional general authentication method, security has been weakened due to large-scale personal information and password leaks, and thus reinforced identification through additional authentication methods is required. In an alternative method in which a complex password is randomly generated and used, a separate management tool should be used to remember the password, and thus not only does it lose the convenience of knowledge-based methods, but it also places a burden on managing stored passwords and has security constraints in a multi-device environment (where the user uses multiple terminals). Recently, because of these security threats, passwordless authentication methods, that is, authentication methods in which a password is not used, have become preferred.

Further, according to the requirements of zero-trust, when a criterion of granting access rights within a set time is applied for each service, an authentication process should be repeated for each service and each authorization cycle, and thus the user should bear the burden of having to go through the authentication procedure more frequently to maintain service access rights. Further, there is a disadvantage in that, as the number of times authentication is performed increases, the possibility of exposing information about the user who performs authentication also increases.

SUMMARY OF THE INVENTION

The present disclosure is directed to providing a service access control system in which access to a service is controlled by performing facial authentication at regular intervals regardless of user input.

The present disclosure is also directed to providing a service access control system in which facial authentication is performed without causing user fatigue, but reinforced authentication is performed under a condition for service reconnection when facial authentication fails.

Objects of the present disclosure are not limited to the above-mentioned objects and other objects and advantages of the present disclosure which are not mentioned can be understood from the following description and more clearly understood from the embodiments of the present disclosure. It will also be readily apparent that the objects and advantages of the present disclosure may be realized and attained by means of the instrumentalities and combinations particularly pointed out in the appended claims.

According to an aspect of the present disclosure, there is provided an operation method of a service access control system, which includes when an access request of a registered user, which includes access right information, is received through a first user terminal, providing, by a service server, a service to the first user terminal, controlling, by the service server, the first user terminal to capture facial images of the registered user at regular intervals regardless of user input while the service is being provided, obtaining, by an authentication server, the facial images captured by the first user terminal at the regular intervals, performing, by the authentication server, facial authentication at the regular intervals on the basis of the facial images, and when the facial authentication fails, deactivating, by the service server, an access session of the first user terminal to the service and interrupting providing the service.

The operation method of the service access control system may further include, when re-access is requested from the first user terminal in a state in which the access session of the first user terminal is deactivated due to the failure of the facial authentication, requesting, by the service server, reinforced authentication from the authentication server, performing, by the authentication server, the reinforced authentication on a user of the first user terminal, and upon success of the reinforced authentication, resuming, by the service server, the provision of the service to the first user terminal.

In this case, the resuming of the provision of the service may include upon success of the reinforced authentication, reissuing, by the authentication server, access right information of the registered user that has expired due to the failure of the facial authentication, through the first user terminal, when an access request of the registered user, which includes the reissued access right information, is received through the first user terminal, identifying, by the service server, whether the reissued access right information is valid through the authentication server, and when the reissued access right information is valid, providing, by the service server, the service to the first user terminal.

In the performing of the reinforced authentication, a request for performing of the reinforced authentication for the first user terminal may be transmitted to an authentication portal connected to a separate authentication channel.

Alternatively, in the performing of the reinforced authentication, the authentication server may transmit an image including code information to the first user terminal, and when another second user terminal that has been previously registered for a reinforced authentication procedure of the user of the first user terminal accesses a web page matching the code information, perform the facial authentication through the second user terminal.

Meanwhile, the operation method of the service access control system may further include, when access to the service is requested from a third user terminal of the unregistered user who has not been issued the access right information, requesting, by the service server, registration of authentication information for facial authentication and reinforced authentication of the unregistered user from the authentication server, registering, by the authentication server, a facial image received from the third user terminal for facial authentication of the unregistered user, setting, by the authentication server, the third user terminal or another fourth user terminal of the unregistered user as a target terminal of reinforced authentication according to a reinforced authentication procedure selected according to a user input received through the third user terminal, performing identity authentication related to the reinforced authentication through the target terminal and registering the reinforced authentication procedure of the target terminal, and when the reinforced authentication procedure is registered, issuing, by the authentication server, access right information to the third user terminal of the unregistered user and registering the unregistered user.

In this case, in the registering of the reinforced authentication procedure of the target terminal, when the third user terminal is set as the target terminal matching the reinforced authentication procedure of the unregistered user, the authentication server may provide information about a web page for performing the reinforced authentication to the third user terminal through an authentication portal connected to a separate authentication channel.

Alternatively, in the registering of the reinforced authentication procedure of the target terminal, when the fourth user terminal is set as a target terminal matching the reinforced authentication procedure of the unregistered user, at least one web page for identification related to the reinforced authentication may be provided to the fourth user terminal, and when the identity authentication of the fourth user terminal is performed through the web page, the authentication server may register the reinforced authentication procedure of the unregistered user for the fourth user terminal.

In addition, the operation method of the service access control system may further include, when a first access request for the service is received from the third user terminal after the access right information is issued, requesting, by the service server, reinforced authentication for the user terminal from the authentication server, performing, by the authentication server, the reinforced authentication for the registered user of the third user terminal, and upon success of the reinforced authentication, providing, by the service server, the service to the third user terminal.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
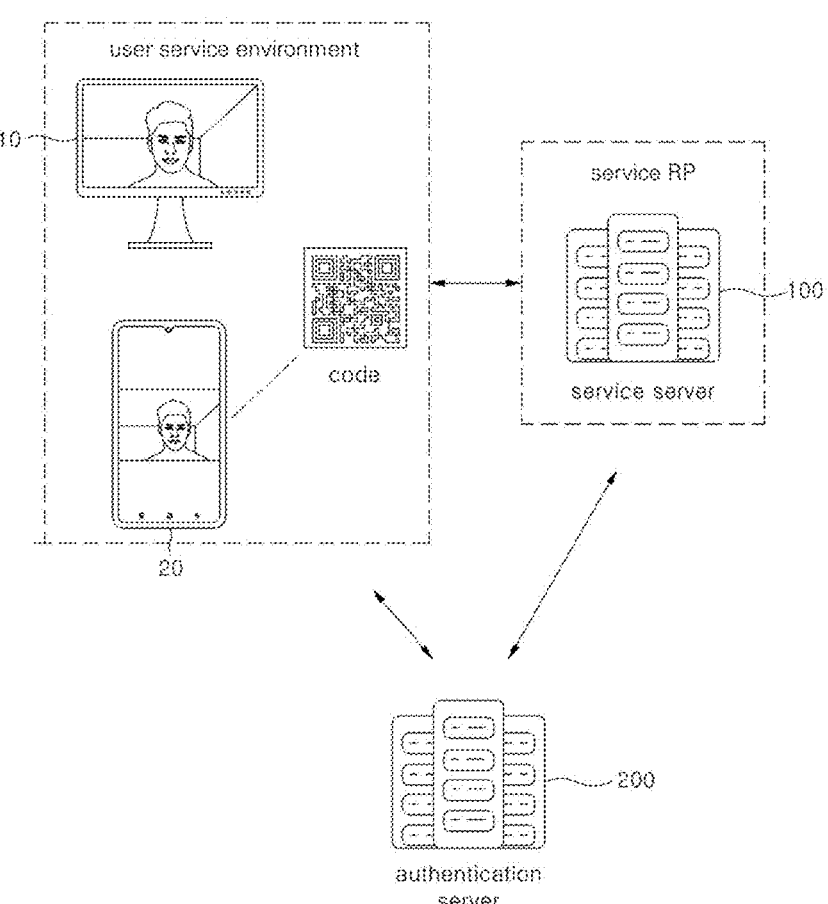
FIG. 1 is a diagram for describing a configuration and operation of a service access control system according to the present disclosure.

Before the present disclosure is described in detail, the description method of the specification and drawings will be described.

First, terms used in this specification and claims are selected from among general terms in consideration of functions in various embodiments of the present disclosure. However, these terms may vary depending on the intention of a person skilled in the art, legal or technical interpretation, or the advent of new technology. Further, some terms are arbitrarily selected by the applicant. These terms may be interpreted as defined in this specification, and when there is no specific definition of the terms, they may be interpreted based on the overall content of this specification and common technical knowledge in the art.

Further, like reference numerals or designations in the accompanying drawings of this specification may refer to like parts or components performing substantially the same function. For the convenience of description and understanding, like reference numerals or designations are used in different embodiments to describe them. That is, even when components having like reference numerals are illustrated in multiple drawings, the multiple drawings are not necessarily of one embodiment.

Further, terms including ordinal numbers such as "first," "second," etc. may be used in this specification and claims to distinguish between components. These ordinal numbers are used to distinguish between identical or similar components, and the meanings of the terms should not be interpreted in a limited manner due to the use of these ordinal numbers. For example, components combined with these ordinal numbers should not be restricted in terms of the order of use or arrangement, etc., by their numbers. As necessary, the respective ordinal numbers may be used interchangeably.

As used herein, the singular forms "a" and "an" are intended to include the plural forms as well, unless the context clearly indicates otherwise. It should be further understood that the terms "comprise," "comprising," "include," and/or "including" used herein specify the presence of stated features, integers, steps, operations, components, parts, or combinations thereof, but do not preclude the presence or addition of one or more other features, integers, steps, operations, components, parts, or combinations thereof.

In the embodiments of the present disclosure, the terms "module," "unit," "part," etc. refer to components that perform at least one function or operation, and may be implemented by hardware or software or a combination thereof. Further, a plurality of "modules," "units," "parts," etc. may be integrated into at least one module or chip and implemented as at least one processor, except in cases where each needs to be implemented as individual specific hardware.

Further, in the embodiments of the present disclosure, when a portion is referred to as being "connected" to another portion, it includes "directly connected" and "indirectly connected" through a medium. Further, when a certain portion "includes" a certain component, this does not exclude other components from being included unless described otherwise, and other components may in fact be included.

FIG. 1 is a diagram for describing a configuration and operation of a service access control system according to the present disclosure. Referring to FIG. 1, the service access control system of the present disclosure may include a service server 100 and an authentication server 200.

The service server 100 is a device for providing a service to at least one user terminal. The service server 100 may provide the service to the user terminal through at least one web page or application that is accessible through a network environment.

In this case, the service may correspond to a security-critical service related to internal work within an organization, such as a video conference, an enterprise resource planning (ERP) service, etc., but the present disclosure is not limited thereto, and examples of the service may include various types of services that can be provided to at least one user terminal.

The service server 100 may form a relying party (RP) for authentication and is linked to the authentication server 200 that verifies whether a user attempting to access the service is a user with the right to use the service.

The service server 100 may correspond to a device or system including at least one computer including at least one memory and at least one processor.

The authentication server 200 is a device for performing facial authentication or reinforced authentication through at least one user terminal. To this end, the authentication server 200 may register each user's facial image or code converted from the facial image for each user.

The authentication server 200 may correspond to a device or system including at least one computer including at least one memory and at least one processor.

A user service environment may include one or more user terminals 10, 20, etc. for providing a service to a user. For example, when the service is a video conference, the user service environment may include a user terminal 10 for providing the video conference by being connected to a camera for photographing the user during the video conference. In this case, periodic facial authentication of the authentication server 200 may be performed through facial images periodically obtained through the user terminal 10 while the service is being provided. When the facial authentication fails, an access session of the user terminal 10 to the service (e.g., the video conference) may be deactivated, causing the service provision to be interrupted, and the authentication server 200 may perform reinforced authentication through the user terminal 10 or a separate user terminal 20. Here, the service server 100 may resume providing the service to the user terminal 10 assuming that the reinforced authentication is successful.

In order to enable the service or authentication by linking to the service server 100 or the authentication server 200 described above, a camera control function for obtaining the user's facial information and a facial information module for encoding the obtained facial information may be installed in the user service environment. The facial information module may be included in the user terminal (e.g., 10 or 20), but as user service environments are increasingly becoming virtualized, the facial information module may be located anywhere, such as in a network section connected to a service access environment (e.g., another user terminal, a virtual module in an external server, etc.) rather than physically in the user terminal (e.g. 10).

A camera for facial authentication may be included in the user terminal 10 in which the service is provided, or may be implemented as a separate camera device connected to the user terminal 10 and installed to photograph the user.

The user terminals (e.g., 10, 20, . . . ) included in the user service environment may include desktop personal computers (PCs) (including output devices such as monitors and the like), laptop computers, kiosks, smartphones, tablet computers, personal digital assistants (PDAs), screen devices, camera devices (e.g., live web cameras), etc., but the present disclosure is not limited thereto.

Communication between the user terminals, the service server 100, and the authentication server 200 that constitute the user service environment may be performed through various wired and wireless communication networks. In this case, in addition to direct communication, the communication is also possible through an indirect communication method using at least one relay device or gateway device.

Each device may include circuits, modules, chips, etc. for performing communication with at least one external device through various wired and wireless communication methods.

Depending on the area or size of the network, the network may be a personal area network (PAN), a local area network (LAN), a wide area network (WAN), etc., and depending on the openness of the network, the network may be an intranet, an extranet, or the Internet.

Each device may be connected to external devices through various wireless communication methods such as Long-Term Evolution (LTE), LTE Advanced (LTE-A), 5th Generation (5G) mobile communication, code division multiple access (CDMA), wideband CDMA (WCDMA), universal mobile telecommunications system (UMTS), Wireless Broadband (WiBro), Global System for Mobile Communications (GSM), Time Division Multiple Access (TDMA), Wi-Fi, Wi-Fi Direct, Bluetooth, near-field communication (NFC), Zigbee, etc.

Each device may be connected to external devices through various wired communication methods such as Ethernet, Internet, Universal Serial Bus (USB), High-Definition Multimedia Interface (HDMI), thunderbolt, etc.

Figure 2:
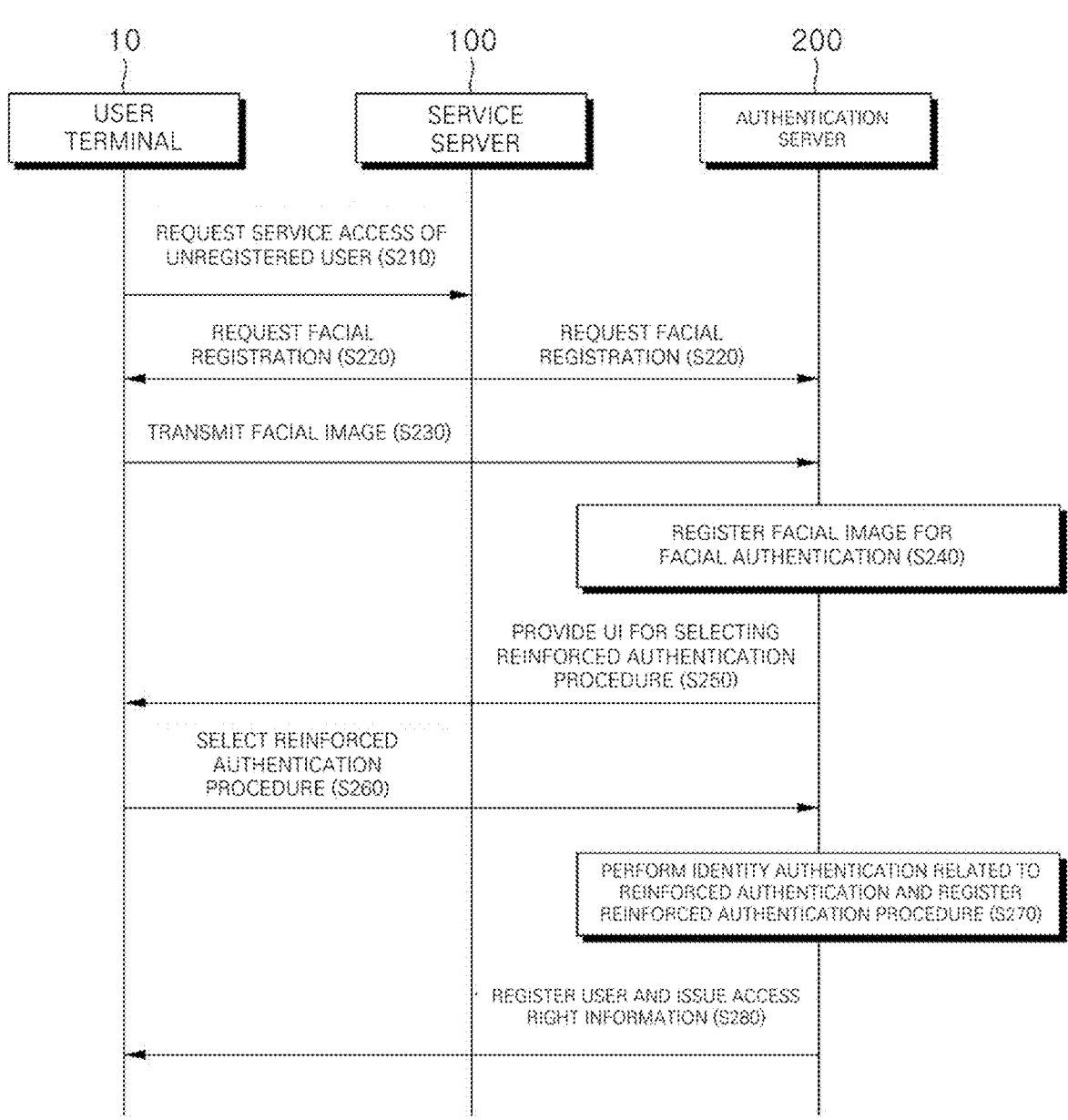
FIG. 2 is a sequence diagram for describing a procedure in which a service access control system according to an embodiment of the present disclosure registers an unregistered user.

FIG. 2 is a sequence diagram for describing a procedure in which a service access control system according to an embodiment of the present disclosure registers an unregistered user.

The unregistered user may be a user who has not been issued access right information for a service. For example, a user terminal may support the user's membership registration process for a service provided by a service server 100. During the membership registration process, by registering a facial image for facial authentication on the authentication server 200, the user terminal may receive the access right information of the user, and as a result, the user may become a registered user.

Hereinafter, more specifically, referring to FIG. 2, first, the service server 100 may receive an access request for a service, of the unregistered user, from the user terminal 10 (S210). Specifically, the service server 100 may transmit data for the received access request to the authentication server 200, and confirm that the corresponding user is an unregistered user who does not have access right information through the authentication server 200.

In this case, the service server 100 may request facial registration for facial authentication from the authentication server 200 and the user terminal 10 (S220). This corresponds to a new registration procedure for an unregistered user, and a facial information module for registering a facial image or code converted from the facial image may be installed in the user terminal 10 that has received the request for facial registration from the service server 100. Such a task may be performed through a conventional method of redirecting an access request to an RP (server or network equipment) to a separate user authentication management portal, but the present disclosure is not limited thereto.

Figure 6:
FIG. 6 is a diagram for describing a user interface (UI) provided by an authentication server according to an embodiment of the present disclosure through a user terminal in order to register a facial image for periodic facial authentication.
Figure 6:
Figure 6:
Figure 6:
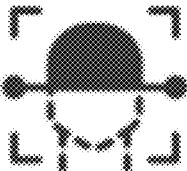
Figure 6:

When the request for facial registration is received, the user terminal 10 may transmit the facial image to the authentication server 200 (S230). To this end, the authentication server 200 may provide a graphic user interface (GUI) that guides the photographing or registration of a face as shown in FIG. 6, through the user terminal 10.

In this way, when the facial image is obtained, the authentication server 200 may register the user's facial image for facial authentication (S240). In this case, image data of the facial image may be stored in the authentication server 200 without change, or may be stored in the form of code that includes feature information extracted from the facial image.

When the above-described facial registration process is completed, the authentication server 200 may perform a registration process of a reinforced authentication procedure.

Specifically, referring to FIG. 2, the authentication server 200 may provide a UI for selecting the reinforced authentication procedure to the user terminal 10 (S250). In addition, the reinforced authentication procedure may be selected according to a user input received through the user terminal 10 (S260).

Here, a reinforced authentication procedure, in which the user terminal 10 receiving the service itself is set as a target terminal, or a reinforced authentication procedure, in which a user terminal (e.g., user terminal 20) different from the user terminal 10 described above is set as the target terminal, may be selected as the reinforced authentication procedure.

For example, when the user terminal 10 is set as a target terminal matching the reinforced authentication procedure, the authentication server 200 may provide web page information for performing identification to the user terminal 10 through an authentication portal connected to a separate authentication channel. In addition, the authentication server 200 may obtain a result of the identity authentication performed on the corresponding web page. In this way, as identity authentication is performed according to the identification, when there is a problem with facial authentication during the subsequent service providing process, reinforced authentication may be performed through communication between the authentication server 200 and the user terminal 20.

As another example, a separate user terminal 20 that is different from the user terminal 10 receiving the service is set as the target terminal matching the reinforced authentication procedure, and the authentication server 200 may provide at least one web page for identification related to the reinforced authentication to the user terminal 20. Specifically, the authentication server 200 may provide code information (e.g., a quick-response (QR) code) for reinforced authentication to the user terminal 10. The corresponding code information may be matched to a web page for performing reinforced authentication through the user terminal 20. Here, when the user terminal 20 accesses a web page by photographing a QR code, the authentication server 200 may perform identification through the user terminal 20. In this case, the user terminal 20 may correspond to a smartphone, a wearable device, etc. that the user personally carries. In this way, as identity authentication is performed according to the identification, when there is a problem with facial authentication during the subsequent service providing process, reinforced authentication may be performed through communication between the authentication server 200 and the user terminal 20.

When the identity authentication is performed through the target terminal according to at least one of the embodiments described above, the authentication server 200 may register the user's reinforced authentication procedure matching the target terminal (S270).

In this way, when the facial registration for facial authentication and the registration for a reinforced authentication procedure are completed, the authentication server 200 may complete the registration procedure for the user.

However, after the registration in the reinforced authentication procedure, the authentication server 200 may request photographing of the face for comparison with a previously registered facial image (or code) from the user terminal 10, and may perform facial authentication by comparing the facial image (or code) received from the user terminal 10 with the registered facial image (or code). In this case, the authentication server 200 may complete the registration procedure for the user assuming that the facial authentication is successful.

The authentication server 200 may complete a registration procedure for a previously unregistered user, and issue access right information for the service to the user (S280). The access right information may include an information value such as an access token, an ID token, a role, etc., but the present disclosure is not limited thereto.

Meanwhile, as described above, when a first access request for the service is received from the user who has received the access right information, the service server 100 may provide the service assuming that the reinforced authentication is performed by the authentication server 200. This only applies to the first access request of the registered user, and will be described in more detail with reference to FIG. 3 below.

Figure 3:
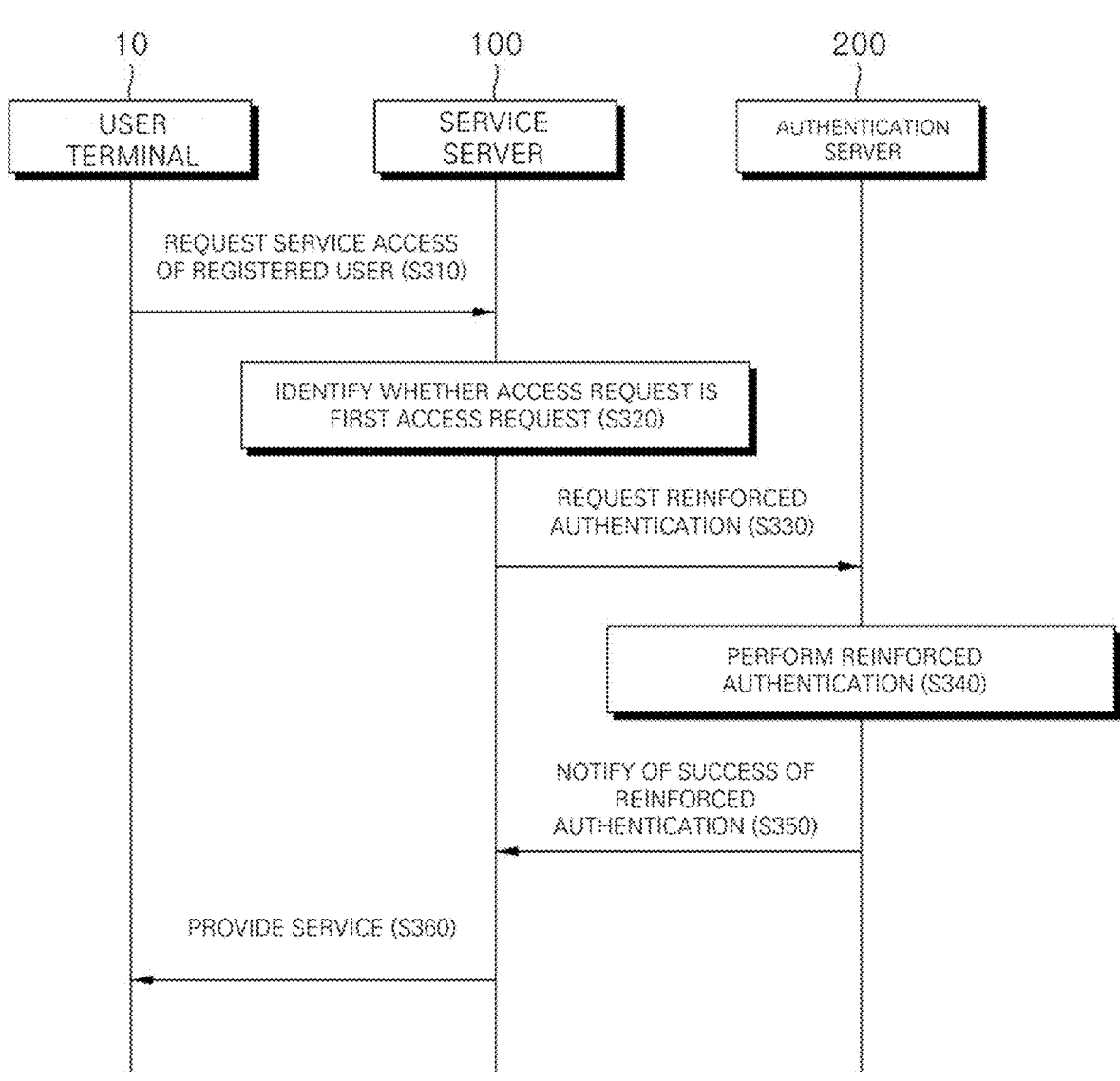
FIG. 3 is a sequence diagram for describing an operation in which the service access control system according to an embodiment of the present disclosure preferentially performs reinforced authentication according to a first access request of a registered user.

FIG. 3 is a sequence diagram for describing an operation in which the service access control system according to an embodiment of the present disclosure preferentially performs reinforced authentication according to a first access request of a registered user.

Referring to FIG. 3, when an access request for a service, of the registered user, is received (S310), the service server 100 may identify whether the access request of the registered user is a first access request after registration on the basis of the confirmation of access right information included in the access request by the authentication server 200 (S320).

When the access request of the registered user corresponds to the first access request, the service server 100 may request the authentication server 200 to perform reinforced authentication (S340).

In this case, the authentication server 200 may perform the reinforced authentication through a target terminal matching a registered reinforced authentication procedure.

When the target terminal is a user terminal 10 that is a target of service provision, the authentication server 200 may perform the reinforced authentication through the separate authentication channel described above, and in this case, the method of reinforced authentication may correspond to face authentication, facial gesture authentication, other biometric information authentication, a one-time password (OTP)/certificate, self-authentication, etc., but the present disclosure is not limited thereto.

When the target terminal is a terminal 20 other than the user terminal 10 that is the target of service provision, the authentication server 200 may provide code information (e.g., a QR code) for reinforced authentication to the user terminal 10. The corresponding code information may be matched to a web page for performing reinforced authentication through the user terminal 20. Here, when the user terminal 20 accesses a web page by photographing a QR code, the authentication server 200 may perform the reinforced authentication through the user terminal 20. In this case the method of reinforced authentication may correspond to facial authentication, facial gesture authentication, other biometric information authentication, an OTP/certificate, self-authentication, etc., but the present disclosure is not limited thereto.

In addition, when the authentication server 200 successfully performs the reinforced authentication (S350), the service server 100 may provide the service to the user terminal 10 (S360).

Hereinafter, specific embodiments in which periodic facial authentication and, as necessary, reinforced authentication are performed during a process of providing a service after an access request of a registered user will be described with reference to FIGS. 4 and 5.

Figure 4:
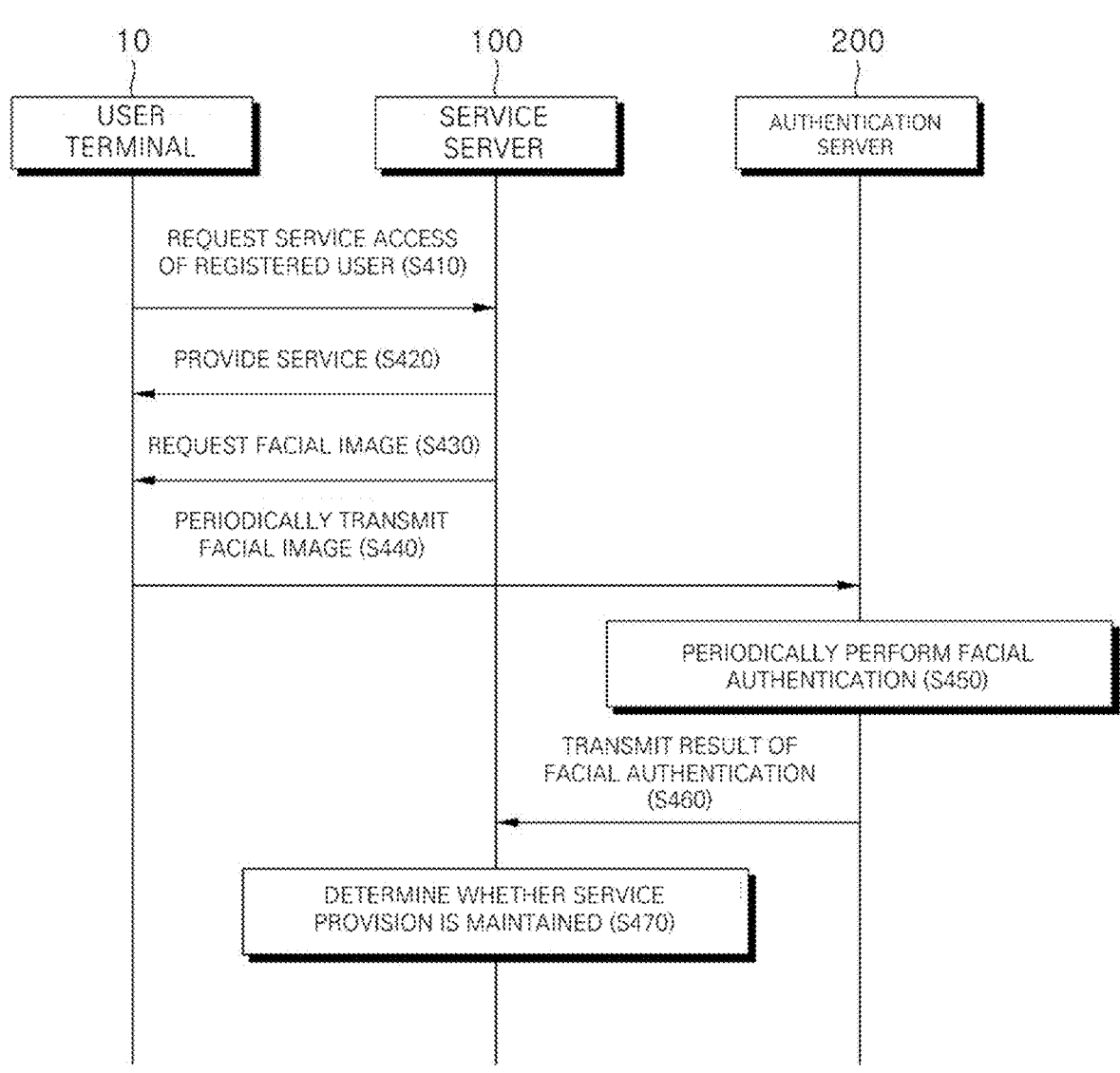
FIG. 4 is a sequence diagram for describing an operation in which the service access control system according to an embodiment of the present disclosure performs periodic facial authentication while a service is provided to a registered user.

FIG. 4 is a sequence diagram for describing an operation in which the service access control system according to an embodiment of the present disclosure performs periodic facial authentication while a service is provided to a registered user.

Referring to FIG. 4, the service server 100 may receive an access request for a service, of the registered user, from the user terminal 10 (S410). Similarly, the service server 100 may identify whether a user matching the access request is the registered user on the basis of the confirmation of access right information included in the access request by the authentication server 200.

As described above, when the access request of the registered user is received, the service server 100 may provide the service to the user terminal 10 (S420).

While the service is being provided, the service server 100 may request a facial image from the user terminal 10 (S430).

Specifically, the service server 100 may control the user terminal 10 to capture facial images of the registered user at regular intervals regardless of user input.

The facial images obtained periodically in this manner may be transmitted to the authentication server 200 (S440). In this case, the user terminal 10 may transmit the facial images to the authentication server 200 through the service server 100 or without going through the service server 100. Here, data for the facial image itself may be transmitted or code obtained by converting the facial image may also be transmitted. When the code obtained by converting the facial image is transmitted, a facial information module of the user terminal 10 may verify the obtained facial image to identify whether a plurality of users are included, whether there is an absence, whether there is a prohibited act (e.g., photographing with a separate camera, possession of prohibited items, etc.) in addition to the code value of the facial image, and add additional code values for the facial image. To this end, the user terminal 10 may include an artificial intelligence model for recognizing each user's face in a facial image, an artificial intelligence model for recognizing objects related to prohibited acts (e.g., separate cameras, prohibited items, etc.), etc. An artificial intelligence model for adding additional code value may be transmitted from the authentication server 200 to the user terminal 10 in the process of performing operation S230 of FIG. 2 described above, but the present disclosure is not limited thereto.

The authentication server 200 may perform periodic facial authentication on the basis of the received facial image (S450). Specifically, the authentication server 200 may compare a pre-registered facial image or code of the user with the received facial image, and the facial authentication may be performed at a certain cycle in which the facial image is received.

In this case, the authentication server 200 may identify a result of the facial authentication according to various situations other than simply a face mismatch. For example, the facial authentication may be identified as having failed in cases where the faces of two or more users are identified in the image obtained through the user terminal 10, where the face of the user is not identified in the image, or the like.

The authentication server 200 may transmit the result of the facial authentication to the service server 100 (S460), and the service server 100 may determine whether the service provision is maintained, on the basis of the result of the facial authentication (S470). For example, when the facial authentication is successful, an access session of the user terminal 10 to the service is maintained without change, but when the facial authentication fails, the service server 100 may deactivate the access session of the user terminal 10 to the service to interrupt providing the service. The deactivation of the access session may be processed within the service by commands such as "logout," "disconnect," "access reject," "login fail," etc., but the present disclosure is not limited thereto. In this case, the access right information of the user that has been issued by the authentication server 200 may be canceled or deactivated. For example, the qualification of an access token that constitutes the access right information may be canceled.

In this way, when the service provision is interrupted due to the failure of the facial authentication, the service server 100 may resume the service provision on the premise of success in reinforced authentication, which will be described with reference to FIG. 5.

Figure 5:
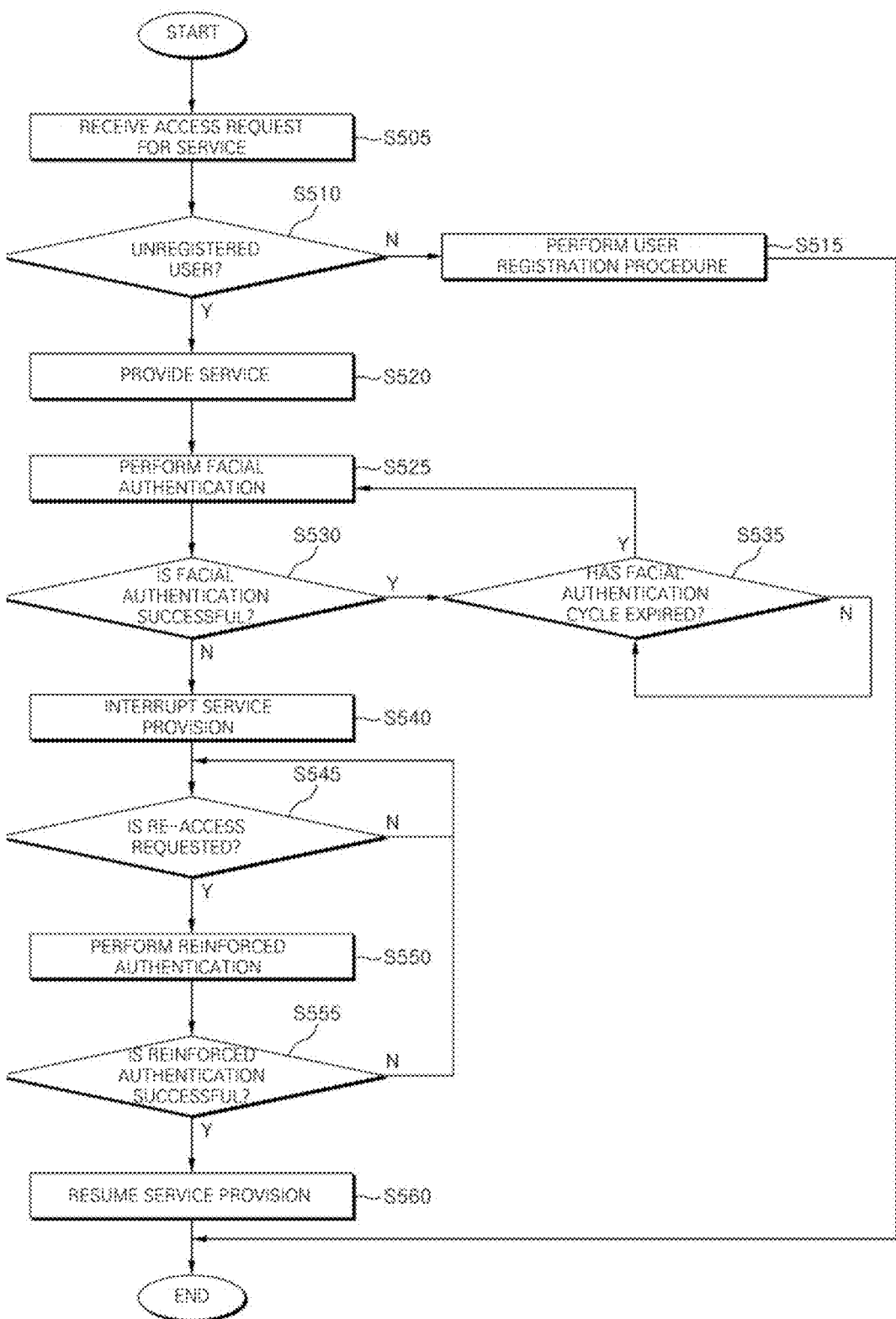
FIG. 5 is an algorithm for describing an operation in which the service access control system according to an embodiment of the present disclosure performs service interruption or reinforced authentication according to a result of periodic facial authentication.

FIG. 5 is an algorithm for describing an operation in which the service access control system according to an embodiment of the present disclosure performs service interruption or reinforced authentication according to a result of periodic facial authentication.

Referring to FIG. 5, the service server 100 may receive an access request for a service from the user terminal 10 (S505), and when a user is an unregistered user who has not been issued access right information (No in S510), the service server 100 may allow the user registration procedure to be performed by the authentication server 200 as illustrated in FIG. 2 (S515).

On the other hand, when an access request of a registered user that includes access right information is received (Yes in S510), the service server 100 may provide the service to the user terminal 10 (S520), whereas the authentication server 200 may perform facial authentication through the user terminal 10 at regular intervals (S525).

The periodic facial authentication may be performed (S530 and S535), and when the facial authentication fails (No in S530), the service server 100 may deactivate an access session of the user terminal 10 and interrupt providing the service (S540).

However, when a re-access request for the service is received from the user terminal 10 while the service provision is interrupted (Yes in S545), the service server 100 may request reinforced authentication for the user from the authentication server 200.

In this case the authentication server 200 may perform the reinforced authentication for the user of the user terminal 10 (S550).

For example, when a target terminal is the user terminal 10 that is a target of service provision, the authentication server 200 may perform the reinforced authentication through the separate authentication channel described above.

For example, when the target terminal is a user terminal 20 other than the user terminal 10 that is the target of service provision, the authentication server 200 may provide code information (e.g., a QR code) for reinforced authentication to the user terminal 10. The corresponding code information may be matched to a web page for performing reinforced authentication through the user terminal 20. Here, when the user terminal 20 accesses a web page by photographing a QR code, the authentication server 200 may perform the reinforced authentication through the user terminal 20.

When the reinforced authentication is successful (Yes in S555), the service server 100 may resume the provision of the service to the user terminal 10 (S560). Specifically, when the reinforced authentication is successful, the authentication server 100 may reissue the access right information of the registered user that has expired due to the failure of the face authentication through the user terminal 10. In addition, when the access request of the registered user that includes the reissued access right information is received through the user terminal 10, the service server 100 may identify whether the access right information reissued through the authentication server 200 is valid. When the reissued access right information is valid, the service server 100 may activate the access session of the user terminal 10 to provide the service.

Meanwhile, FIG. 6 is a diagram for describing a UI provided by an authentication server according to an embodiment of the present disclosure through a user terminal in order to register a facial image for periodic facial authentication. The UI of FIG. 6 may be used for a facial registration process of an unregistered user, and is not provided for a periodic facial authentication process performed during a service providing process. That is, during the service providing process, the facial authentication may be performed at regular intervals without any guidance to the user.

Figure 7A:
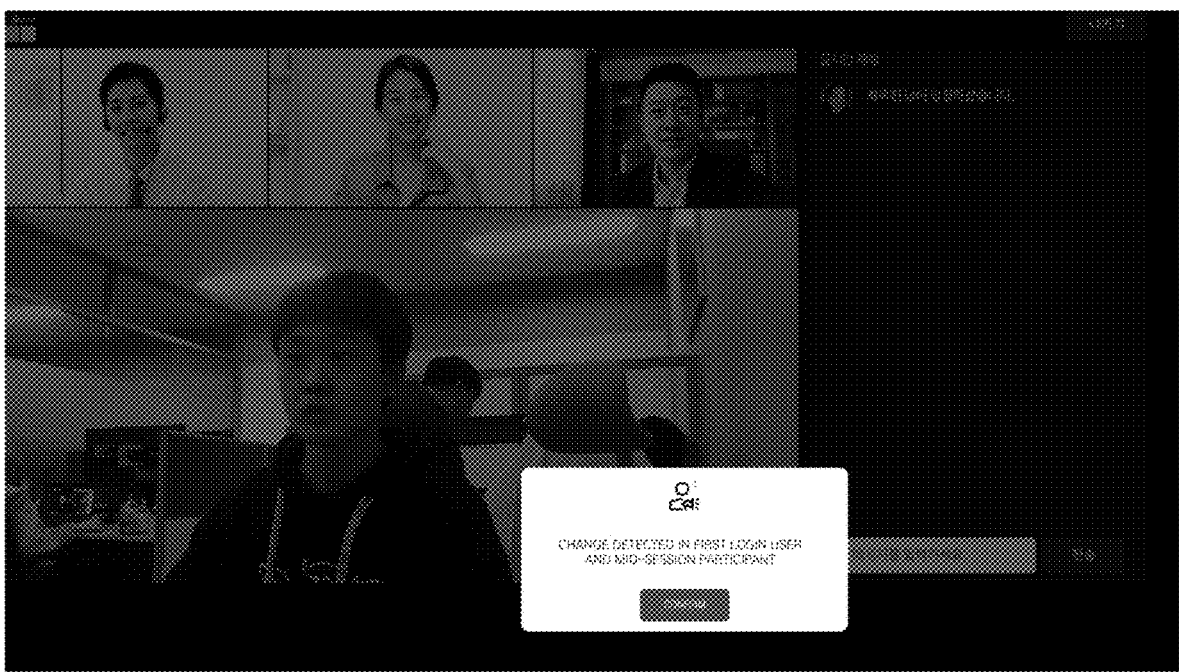
FIGS. 7A to 7C are exemplary diagrams for describing a UI provided through a user terminal in each case where service provision is interrupted due to a failure of facial authentication during a service provision process.
Figure 7B:
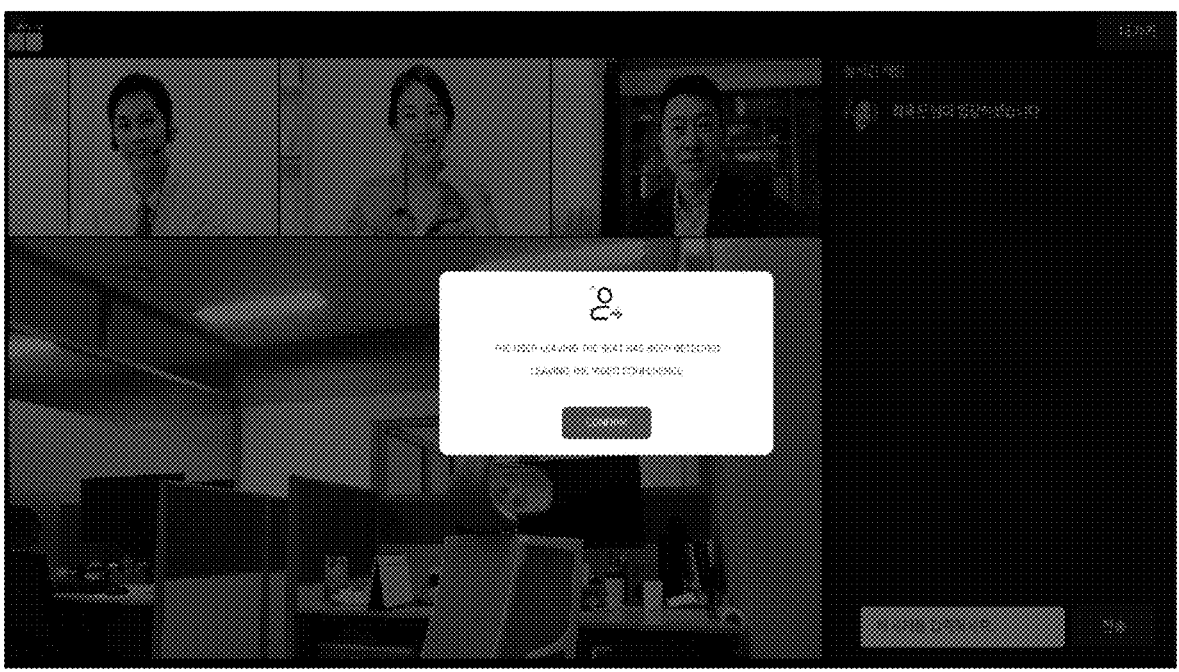
Figure 7C:
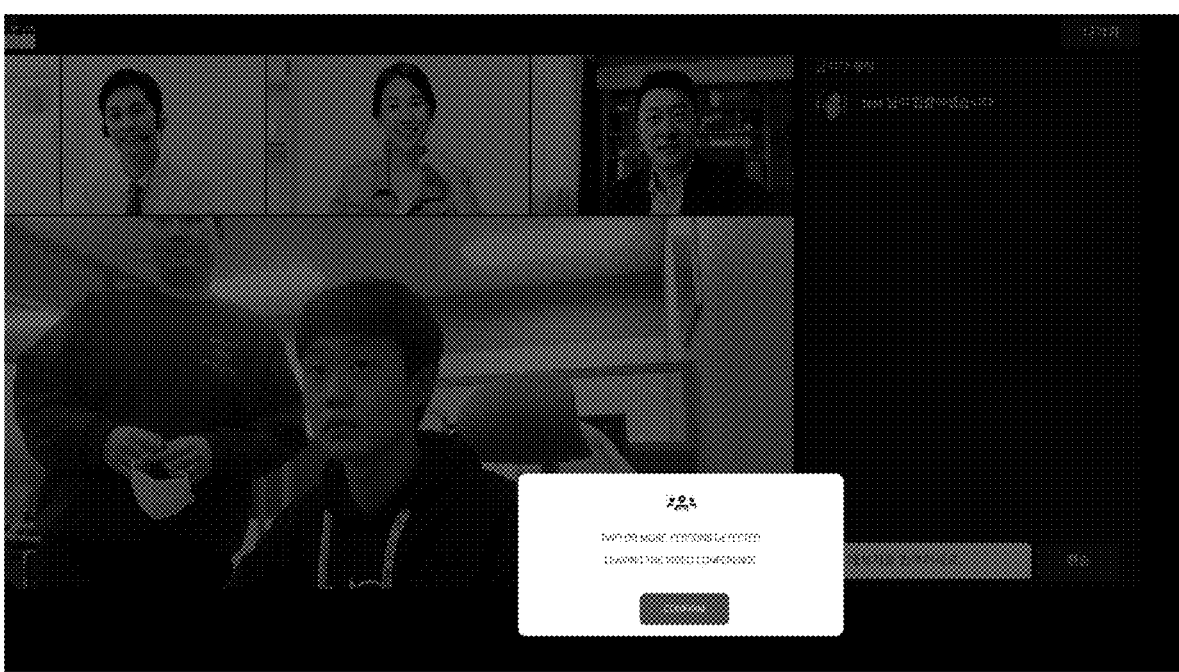

FIGS. 7A to 7C are exemplary diagrams for describing a UI provided through a user terminal in each case where service provision is interrupted due to a failure of facial authentication during a service provision process. FIGS. 7A to 7C are drawings assuming that the service provided is a video conference, and illustrate a service screen provided through the user terminal 10.

As a result of periodic facial authentication being performed in a process of providing a service (video conference), when a face does not match a registered face, as shown in FIG. 7A, when the face is not recognized, as shown in FIG. 7B, or when faces of two or more users are recognized, as shown in FIG. 7C, the facial authentication may be identified as having failed.

As a result, as shown in FIGS. 7A to 7C, the service server 100 may provide a UI item for guiding service interruption through the user terminal 10, and the service server 200 may deactivate an access session to interrupt providing the service. Thereafter, when a re-access request of the user terminal 10 is received, it is possible to resume the service only when reinforced authentication through the authentication server 200 is successful.

Meanwhile, the various embodiments described above may be implemented by combining two or more embodiments as long as they do not conflict with or contradict each other.

Meanwhile, the various embodiments described above may be implemented with a recording medium that can be read by a computer or similar device using software, hardware, or a combination thereof.

In terms of hardware implementation, the embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electrical units for performing functions.

In some cases, the embodiments described herein may be implemented with a processor itself. In terms of software implementation, the embodiments, such as the procedures and functions described herein, may be implemented with separate software modules. Each of the software modules described above may perform one or more functions and operations described herein.

Meanwhile, computer instructions or computer programs for performing processing operations in the service server 100, the authentication server 200, the collection device 300, an artificial intelligence (AI) management device, etc. according to various embodiments of the present disclosure described above may be stored in a non-transitory computer-readable medium. The computer instructions or computer programs stored in the non-transitory computer-readable medium may cause the specific device described above to perform the processing operations in the service server 100, the authentication server 200, the collection device 300, the AI management device 400, etc. according to various embodiments of the present disclosure described above.

The non-transitory computer-readable medium may be a medium that can store data semi-permanently and can be read by a device, rather than a medium that can store data for a short period of time, such as a register, a cache, or a memory. Specific examples of the non-transitory computer-readable medium may include a compact disc read only memory (CD-ROM), a digital video disc (DVD), a hard disk, Blu-ray disc, a memory card, a ROM, etc.

The service access control system according to the present disclosure can perform periodic facial authentication automatically during a service provision process without user awareness or fatigue, and request reinforced authentication only when the facial authentication fails, thereby reducing user fatigue and reinforcing security.

The service access control system according to the present disclosure can authenticate a user by obtaining facial information using a camera attached to a user terminal without user intervention to maintain a secure access environment in which continuous user reliability verification is applied. When there is a change in a user environment, such as a change of users, a seat change, multiple users being identified, or the like, an access session can be automatically blocked and an access right according to the security policy can be controlled through re-authentication.

In a conventional single sign-on technology, it is possible to obtain a right for multiple services in an application area through a single authentication, but in the present disclosure, it is possible to obtain a right for a service up to in an application area through a single authentication at the time of accessing a network environment.

A blocking function due to failure of user facial authentication can effectively respond to threats by applying right revocation and access control collectively in a network environment and application area.

Since a reinforced user authentication method is applied when re-authentication for a user whose face authentication has failed is performed, user reliability can be improved by variously applying reinforced authentication methods according to additional authentication methods to the same user.

While exemplary embodiments of the present disclosure have been illustrated and described above, the present disclosure is not limited to the above-described specific exemplary embodiments. Those skilled in the art may variously modify the present disclosure without departing from the gist of the present disclosure claimed by the appended claims, and such modifications are within the scope of the claims.

What is claimed is:

1. An operation method of a service access control system, comprising:
    when an access request of a registered user, which includes access right information, is received through a first user terminal, providing, by a service server, a service to the first user terminal;
    controlling, by the service server, the first user terminal to capture facial images of the registered user at regular intervals regardless of user input while the service is being provided;
    obtaining, by an authentication server, the facial images captured by the first user terminal at the regular intervals;
    performing, by the authentication server, facial authentication at the regular intervals on the basis of the facial images; and
    when the facial authentication fails, deactivating, by the service server, an access session of the first user terminal to the service and interrupting providing the service;
    when re-access is requested from the first user terminal in a state in which the access session of the first user terminal is deactivated due to the failure of the facial authentication, requesting, by the service server, reinforced authentication from the authentication server; and
    performing, by the authentication server, the reinforced authentication on a user of the first user terminal;
    wherein, in the performing of the reinforced authentication, the authentication server is configured to:
    transmit an image including code information to the first user terminal; and when another second user terminal that has been previously registered for a reinforced authentication procedure of the user of the first user terminal accesses a web page matching the code information, perform the facial authentication through the second user terminal.

2. The operation method of claim 1, further comprising:
    upon success of the reinforced authentication, resuming, by the service server, the provision of the service to the first user terminal.

3. The operation method of claim 2, wherein the resuming of the provision of the service includes:
    upon success of the reinforced authentication, reissuing, by the authentication server, access right information of the registered user that has expired due to the failure of the facial authentication, through the first user terminal;
    when an access request of the registered user, which includes the reissued access right information, is received through the first user terminal, identifying, by the service server, whether the reissued access right information is valid through the authentication server; and
    when the reissued access right information is valid, providing, by the service server, the service to the first user terminal.

4. The operation method of claim 2, wherein, in the performing of the reinforced authentication, a request for performing of the reinforced authentication for the first user terminal is transmitted to an authentication portal connected to a separate authentication channel.

5. The operation method of claim 1, further comprising:
    when access to the service is requested from a third user terminal of the unregistered user who has not been issued the access right information, requesting, by the service server, registration of authentication information for facial authentication and reinforced authentication of the unregistered user from the authentication server;
    registering, by the authentication server, a facial image received from the third user terminal for facial authentication of the unregistered user;
    setting, by the authentication server, the third user terminal or another fourth user terminal of the unregistered user as a target terminal of reinforced authentication according to a reinforced authentication procedure selected according to a user input received through the third user terminal;
    performing identity authentication related to the reinforced authentication through the target terminal and registering the reinforced authentication procedure of the target terminal; and
    when the reinforced authentication procedure is registered, issuing, by the authentication server, access right information to the third user terminal of the unregistered user and registering the unregistered user.

6. The operation method of claim 5, wherein, in the registering of the reinforced authentication procedure of the target terminal, when the third user terminal is set as the target terminal matching the reinforced authentication procedure of the unregistered user, the authentication server provides information about a web page for performing the reinforced authentication to the third user terminal through an authentication portal connected to a separate authentication channel.

7. The operation method of claim 5, wherein, in the registering of the reinforced authentication procedure of the target terminal, when the fourth user terminal is set as a target terminal matching the reinforced authentication procedure of the unregistered user, at least one web page for identification related to the reinforced authentication is provided to the fourth user terminal, and when the identity authentication of the fourth user terminal is performed through the web page, the authentication server registers the reinforced authentication procedure of the unregistered user for the fourth user terminal.

8. The operation method of claim 5, further comprising:

when a first access request for the service is received from the third user terminal after the access right information is issued, requesting, by the service server, reinforced authentication for the user terminal from the authentication server;

performing, by the authentication server, the reinforced authentication for the registered user of the third user terminal; and upon success of the reinforced authentication, providing, by the service server, the service to the third user terminal.

\* \* \* \* \*